United States Patent [19]

Fuchs et al.

[11] Patent Number: 5,717,016
[45] Date of Patent: Feb. 10, 1998

[54] CAOUTCHOUC MIXTURE, TIRE TREAD MANUFACTURED THEREFROM AND TIRE HAVING THIS TREAD

[75] Inventors: Hans-Bernd Fuchs, Alzenau-Hörstein; Günther Dietrich, Frankfurt; Ulrich Steinbrecht, Ober-Ramstadt, all of Germany

[73] Assignee: SP Reifenwerke GmbH, Hanau, Germany

[21] Appl. No.: 538,595

[22] Filed: Oct. 4, 1995

[30] Foreign Application Priority Data

Nov. 30, 1994 [DE] Germany ............ 44 42 692.5
Nov. 30, 1994 [DE] Germany ............ 44 42 691.7

[51] Int. Cl.$^6$ .................................................. C08K 5/24
[52] U.S. Cl. ................. 524/262; 524/304; 524/305; 524/492; 524/493; 524/495
[58] Field of Search ................... 524/262, 304, 524/305, 492, 493, 495

[56] References Cited

U.S. PATENT DOCUMENTS

| | | | |
|---|---|---|---|
| 4,357,432 | 11/1982 | Edwards | 523/351 |
| 4,398,582 | 8/1983 | Yuto et al. | 152/209 |
| 4,481,327 | 11/1984 | Ogawa et al. | 524/432 |
| 4,522,970 | 6/1985 | Scriver et al. | 524/447 |
| 4,530,959 | 7/1985 | Armbruster et al. | 524/526 |
| 4,737,535 | 4/1988 | Furukawa et al. | 524/113 |
| 4,756,353 | 7/1988 | Nordsiek et al. | 152/209 |
| 4,820,751 | 4/1989 | Takeshita et al. | 523/215 |
| 4,835,209 | 5/1989 | Kitagawa et al. | 524/507 |
| 5,328,949 | 7/1994 | Sandstrom et al. | 524/305 |
| 5,336,730 | 8/1994 | Sandstrom et al. | 524/305 |
| 5,447,971 | 9/1995 | Bergh et al. | 524/262 |
| 5,504,137 | 4/1996 | Sandstrom et al. | 524/99 |
| 5,504,140 | 4/1996 | Zanzig et al. | 524/526 |
| 5,534,574 | 7/1996 | Sandstrom et al. | 524/262 |
| 5,534,599 | 7/1996 | Sandstrom et al. | 525/342 |

FOREIGN PATENT DOCUMENTS

| | | |
|---|---|---|
| 0 346 147 B1 | 12/1989 | European Pat. Off. . |
| 447066 | 9/1991 | European Pat. Off. . |
| 501227 | 9/1992 | European Pat. Off. . |
| 0 623 650 A1 | 11/1994 | European Pat. Off. . |
| 3 813 678 | 7/1990 | Germany . |
| 43 19 240 A1 | 12/1994 | Germany . |

Primary Examiner—Kriellion S. Morgan
Attorney, Agent, or Firm—Birch, Stewart, Kolasch & Birch

[57] ABSTRACT

Rubber mixtures vulcanisable with sulphur are proposed which lead to tires with a good rolling resistance and driving behavior on wet roads without the other driving characteristics deteriorating. The rubber mixtures contain a copolymer of conjugated diene and vinyl aromatic compound manufactured by emulsion polymerisation, polyisoprene, polybutadiene, silica, carbon black in a specific range of quantities and also customary additives and a vulcanisation system. A further embodiment additionally contains copolymer manufactured by solution polymerisation in specific quantity ranges, and in this embodiment the polyisoprene is an optional component.

21 Claims, No Drawings

CAOUTCHOUC MIXTURE, TIRE TREAD MANUFACTURED THEREFROM AND TIRE HAVING THIS TREAD

The present invention relates to rubber mixtures vulcanisable with sulphur which contain a copolymer of conjugated diene and vinyl aromatic compound, silica as a filler, customarily used additives and also a vulcanisation system. Furthermore the invention relates to tire treads which contain these rubber mixture and also tires with a tire tread which contains the vulcanised rubber mixture. The characteristics desired in tires, such as low rolling resistance, good adhesion to wet roads, high resistance to abrasion, can only be achieved with difficulty because they are partly mutually contradictory. Thus measures which lead to a reduction of the rolling resistance bring about a reduction of the resistance to abrasion or scuff resistance. The full or partial substitution of carbon black by the filler material silica, for example admittedly reduces the rolling resistance of the tire but causes a deterioration of its resistance to abrasion.

In EP 0 447 066 A1, tires are described which are manufactured from rubber mixtures which contain at least 30 parts by weight of polybutadiene or styrene-butadiene copolymer manufactured by solution polymerisation which can each also be present in silane modified form, with a glass transition temperature not below −50°, at least 70 parts by weight of another diene elastomer, silica as filler and also special silane coupling agents. A whole series of elastomers is listed as other diene elastomers, amongst other things natural rubber, polyisoprene, styrene-butadiene copolymer manufactured by emulsion polymerisation, polybutadiene, but in the examples only natural rubber is used as the other diene elastomer. These rubber mixtures are intended to provide a good compromise between wet grip, rolling resistance and resistance to abrasion.

In order to obtain a good compromise between the mutually contradictory characteristics it is proposed in EP 0 299 074 B1, for rubber mixture which contain silica as filler in large proportions, that polymers should be used which have been modified with a special silane compound. This measure is unfavourable for industrial use because of the utilization of special silane compounds.

In order to avoid this disadvantage, a rubber mixture is proposed in EP 0 501 227 A1 which contains a copolymer of conjugated diene and vinyl aromatic compound manufactured by solution polymerisation in a hydro carbon solvent, a very special silica which is, for example, produced in accordance with the method described in EP 0 157 703 B1, customarily used additives and also a vulcanisation system. This rubber mixture is manufactured in known manner by stepwise mixing of the components, with temperatures being kept to at which no cross-linking occurs. At least one further diene elastomer, such as for example polyisoprene, natural rubber or polybutadiene can be added as a diluent to the rubber mixture.

In the examples and comparative examples of this document, tire treads are compared with one another which were manufactured from rubber mixtures which contain styrene-butadiene copolymer manufactured by emulsion polymerisation and special silica or classical silica or carbon black as filler, or which contain styrene-butadiene copolymer manufactured by solution polymerisation and special silica or carbon black as filler. It can be deduced from the results given that the treads claimed in EP 0 501 227 A1 result in a better compromise between the mutually contradictory characteristics when compared with the comparison treads.

The object of the invention is the preparation of rubber mixtures which result in a good compromise between the mutually contradictory characteristics in tire treads without having to use special silicas. In particular, the rubber mixtures should result in tire treads which have all the known advantageous characteristics achievable with silica without the other good characteristics caused by carbon black being impaired.

Starting from the initially named rubber mixture vulcanisable with sulphur, this object is satisfied in a first embodiment in that the rubber mixture contains 5 to 80 parts by weight of copolymer of conjugated diene and vinyl aromatic compound manufactured by solution polymerisation, 10 to 85 parts by weight of copolymer of conjugated diene and vinyl aromatic compound manufactured by emulsion polymerisation, 0 to 40 parts by weight of polyisoprene, 10 to 50 parts by weight of polybutadiene, 25 to 90 parts by weight of silica and also 5 to 90 parts by weight of carbon black, with all parts by weight being respectively related to 100 parts by weight of total elastomers.

In a second embodiment the object is satisfied in that the rubber mixture contains 10 to 85 parts by weight of copolymer of conjugated diene and vinyl aromatic compound manufactured by emulsion polymerisation, 5 to 40 parts by weight of polyisoprene, 10 to 50 parts by weight of polybutadiene, 25 to 90 parts by weight of silica and also 20 to 90 parts by weight of carbon black, with all parts by weight being respectively related to 100 parts by weight of total elastomers.

It has been found that these rubber mixtures lead to tire treads with improved rolling resistance and improved adhesion to wet roads without deterioration of the resistance to abrasion when they are compared with tire treads which contain only carbon as filler material and also styrene-butadiene copolymer as elastomer.

The rubber mixtures of the invention can be used for the Manufacture of tire treads which are suitable for tires of motor cars, motor cycles, 4×4 overland vehicles, transporters and light trucks.

1,3-butadiene, isoprene or 2,3-dimethyl-1,3-butadiene can be used for the copolymers. Styrene, o-, m- and p-methyl-styrene are suitable as the vinyl aromatic compound. The styrene-butadiene copolymers are preferred.

The copolymer of conjugated diene and vinyl aromatic compound manufactured by solution polymerisation is in particular contained in the rubber mixture of the first embodiment in a quantity of 10 to 28 parts by weight related to 100 parts by weight of total elastomers. In accordance with the invention, all commercially available styrene-butadiene copolymers manufactured by solution polymerisation can be used. Copolymers with a glass transition temperature (Tg) of −15° C. to −30° C. are preferred.

The copolymer of conjugated diene and vinyl aromatic compound manufactured by emulsion polymerisation is preferably contained in the rubber mixtures of the first embodiment in a quantity of 20 to 70 parts by weight, and in particular 20 to 65 parts by weight related to 100 parts by weight of total elastomers.

The copolymer manufactured by emulsion polymerisation is preferably contained in the rubber mixtures of the second embodiment in a quantity of 20 to 75 parts by weight, and in particular 50 to 75 parts by weight, related to 100 parts by weight of total elastomers.

In accordance with the invention, all commercially available styrene-butadiene copolymers manufactured by emulsion polymerisation can be used. In general, the glass transition temperature (Tg) lies in the range from −20° C.

and −70 C. Preferably, copolymers are used with a glass transition temperature in the range from −25° C. to −55 C. The content of vinyl aromatic compound in the copolymer manufactured by emulsion polymerisation preferably lies in the range from 10 and 50% by weight, particularly preferred in the range from 15 to 45% by weight.

The values of the glass transition temperature quoted for the copolymers are values determined by the torsional pendulum method.

The copolymers are used in the form of oil-extended copolymers. As a rule, the total oil content of the rubber mixtures can lie in the range from 20 to 50, preferably 30 to 45 parts by weight per 100 parts by weight of total elastomers.

When the rubber mixtures of the first embodiment contain polyisoprene, the content preferably lies in the range from 5 to 30 parts by weight, and in particular in the range from 10 to 30 parts by weight related to 100 parts by weight of total elastomers.

The rubber mixtures of the second embodiment preferably contain 10 to 30 parts by weight of isoprene, and in particular 10 to 25 parts by weight related to 100 parts by weight of total elastomers.

In accordance with the invention, all commercially available polyisoprenes can be used. Preferably, polyisoprenes are used with a 3,4-bond content of at least 50% by weight. Polyisoprenes with a predominating 3,4-bond content are particularly preferred.

The content of polybutadiene in the rubber mixtures of the first embodiment preferably amounts to 15 to 40 parts by weight related to 100 parts by weight of total elastomers.

The content of polybutadiene in the rubber mixtures of the second embodiment preferably amounts to 15 to 50 parts by weight, and in particular 15 to 25 parts by weight related to 100 parts by weight of total elastomers.

All commercially available polybutadienes can be used. One preferably uses polybutadienes with a 1,4-cis-bond content of at least 90% by weight.

The rubber mixtures of the invention contain silica as a filler material. The preferred range of quantities amounts in the first embodiment to 30 to 90 parts by weight related to 100 parts by weight of total elastomer content, and in the second embodiment to 30 to 80 parts by weight, and in particular 30 to 45 parts by weight related to 100 parts by weight of total elastomer content.

As silica one can use both "classical" silica as well as silica with optimized dispersability in the rubber mixture. Under "classical" silica there is to be understood silica such as is customarily used for tire manufacture and is offered as a commercial product from various manufacturers. These silicas customarily have a BET surface between 100 and 250 m²/g, a CTAB-surface between 100 and 250 m²/g and an oil pick-up measured with DBP between 150 and 250 ml/100 g. As silica with an optimized dispersability one can for example use silica such as is described in EP 0 157 703 B1. In accordance with the invention, a silica with a BET-surface between 150 and 250 m²/g is preferably used.

As a further filler, the rubber mixtures of the invention contain carbon black. In a preferred group of the first embodiment, the content lies in the range of 30 to 70 parts by weight related to 100 parts by weight of total elastomers. In this group, the silica content is preferably selected to be lower, approximately in the range from 30 to 50 parts by weight. In a second preferred group of the first embodiment, a lower carbon black content correspondingly correlates with a higher silica content, approximately in the range of 70 to 90 parts by weight.

The carbon black content amounts in a second embodiment preferably to 30 to 70 parts by weight, and in particular to 30 to 55 parts by weight per 100 parts by weight of total elastomers.

Within the ranges for the silica content and the carbon black content quoted for the second embodiment, a smaller proportion of carbon black is selected when using a high proportion of silica and vice versa. Preferably, the total quantity of silica and carbon black amounts to 60 to 100 parts by weight per 100 parts per weight of total elastomers.

The carbon black types which are offered commercially for tire manufacture can be used as carbon black. The carbon black can also be added as a component of the reinforcing agent of the rubber mixtures of the invention. The coded carbon black contents thus include this proportion of carbon black in the reinforcing agent.

As customary additives the rubber mixtures of the invention can contain aromatic and/or naphthenic oils, reinforcing agents, aging protection agents, tackifiers, activators and processing agents. Furthermore, the rubber mixtures of the invention contain a vulcanisation system with sulphur and vulcanisation accelerators.

The rubber mixtures can be manufactured in accordance with the following multi-state process. In a first stage the elastomers are mixed in a kneader with the customary additives, with the carbon black and with the silica. During this the temperature should not rise to values at which crosslinking already sets in. Customarily, temperatures of 160° C. should not be exceeded. After the cooling down of the mixture it is kneaded once again in a second stage and again the temperature should not rise to values at which crosslinking takes place. In the third stage the vulcanisation system is worked in on a roll and here the temperatures are also kept below the crosslinking temperature. The times for the mixing processes in the individual stages are respectively so dimensioned that a good through mixing of the components is achieved.

The invention will be explained in more detail with reference to the following examples.

The loss factor of the rubber mixtures of the invention and of the rubber mixtures manufactured for comparison purposes were determined on vulcanised sample bodies respectively manufactured from the mixtures. For determination of the loss factor (tan δ) a reference is made to DIN 53513. A low tan δ correlates to a low rolling resistance. The rolling resistance and the driving behaviour on wet roads was determined for tires with vulcanised treads which were manufactured from the rubber mixtures of the invention and from the comparison rubber mixtures. The rolling resistance was determined in accordance with DIN ISO 8767. The driving behaviour on wet roads was tested with a vehicle equipped with the corresponding tires on a test track with defined carriageway (road) conditions. The carriageway is provided with a water film of defined layer thickness. The vehicle was thereby driven at ca. 100 to 110 km/h over the carriage way. During this, driving took place along stretches, curves and chicanes. Criteria such as traction, oversteer and understeer, accelerations, braking etc. were evaluated during the test.

Six rubber mixtures in accordance with the invention (examples 1 to 6) of the first embodiment and one comparison rubber mixture (example 7) with the compositions set forth in the following table 1 were manufacture and in each case the parts by weight of the components in the mixtures are quoted.

TABLE 1

| Components | \multicolumn{7}{c}{Examples} |
|---|---|---|---|---|---|---|---|
|  | 1 | 2 | 3 | 4 | 5 | 6 | 7 |
| Emulsion-SBR 1 | — | — | — | — | — | — | 31,73 |
| Solution-SBR | 34,375 | 34,375 | 34,375 | 34,375 | 34,375 | 34,375 |  |
| Emulsion-SBR 2 | 41,25 | 61,875 | 41,25 | 41,25 | 41,25 | 41,25 | 93,87 |
| Polyisoprene | 15 |  | 15 | 15 | 15 | 15 |  |
| Polybutadiene | 30 | 30 | 30 | 30 | 30 | 30 |  |
| Silica VN3 | 80 | 80 | 37,5 | 37,5 | 80 |  |  |
| Silica 3370 |  |  |  |  |  | 80 |  |
| Carbon black N 375 |  |  |  | 40 |  |  |  |
| Carbon black Vulkan 5H |  |  | 40 |  |  |  |  |
| Carbon black N 234 |  |  |  |  |  |  | 79 |
| Reinforcing agent | 12,8 | 12,8 | 6 | 6 | 13,3 | 13,8 |  |
| Zinc oxide | 3 | 3 | 3 | 3 | 3 | 3 | 3 |
| Stearic acid | 2 | 2 | 2 | 2 | 2 | 2 | 2 |
| Aging protection agent A | 2,5 | 2,5 | 2,5 | 2,5 | 2,5 | 2,5 | 2,5 |
| Aging protection agent B | 1 | 1 | 1 | 1 | 1 | 1 | 1 |
| Ozone proteation agent A | 1 | 1 | 1 | 1 | 1 | 1 | 1 |
| Ozone protection agent B | 2 | 2 | 2 | 2 | 2 | 2 | 2 |
| Aromatic oil | 17,5 | 11,875 | 17,5 | 17,5 | 17,5 | 17,5 | 12,7 |
| (Total oil content) | 38,125 | 38,125 | 38,125 | 38,125 | 38,125 | 38,125 | 38,3 |
| Vulcanisation accelerator A | 1,6 | 1,6 | 1,6 | 1,6 | 1,6 | 1,6 |  |
| Vulcanisation accelerator B | 1,5 | 1,5 | 0,75 | 0,75 | 1,5 | 1,5 |  |
| Vulcanisation accelerator C |  |  |  |  |  |  |  |
| Sulphur | 1,5 | 1,5 | 1,4 | 1,4 | 1,5 | 1,5 | 1,9 |

TABLE 2

|  | \multicolumn{7}{c}{Examples} |
|---|---|---|---|---|---|---|---|
|  | 1 | 2 | 3 | 4 | 5 | 6 | 7 |
| Reference values to the measured tan δ at 70° C. | 134 | 143 | 130 | 134 | 134 | 145 | 100 |
| Rolling resistance | 111 | 114 | 105 | 104 | 112 | 119 | 100 |
| Driving behaviour on wet roads | 102 | 98 | 99 | 99 | 102 | 103 | 100 |

The components set forth in table 1 are explained in the following:

Solution-SBR: Oil-extended styrene-butadiene copolymer manufactured by solution polymerisation with 37.5 parts by weight of oil per 100 parts by weight of styrene-butadiene copolymer, with 25 parts by weight of styrene per 100 parts by weight of styrene-butadiene copolymer, with a 1,2-vinyl content in the butadiene component of ca. 67% and with a Tg of −25° C.

Emulsion-SBR 1: Styrene-butadiene copolymer manufactured by emulsion polymerisation with 22.5 to 24.5 percent by weight of styrene, with 8% 1,4-cis-bonds in the butadiene component, 53% 1,4-trans bonds in the butadiene component and 15% 1,2-vinyl bonds in the butadiene component and also with a Tg of −50° C.

Emulsion-SBR 2: Oil-extended styrene-butadiene copolymer manufactured by emulsion polymerisation with 37.5 parts by weight of highly aromatic oil per 100 parts by weight of styrene-butadiene copolymer, with 22.5 to 24.5 weight percent styrene in the pure (non oil-extended) styrene-butadiene copolymer, with 8% 1,4-cis-bonds in the butadiene component, 53% 1,4-trans bonds and 15% 1,2-vinyl bonds in the butadiene component and also with a Tg of −50° C.

Polyisoprene: 60% 3,4-content (NMR method), Tg approximately −10° C.

Polybutadiene: 97% 1,4-cis bonds, 2% 1,4-trans bonds, less than 1% vinyl bonds, Tg approximately −106° C.

Silica VN 3: BET surface 170 m²/g, commercial product of Degussa Ultrasil® VN3 granulate.

Silica 3370: Specific surface (N2) 170 m²/g, specific surface CTAB 165 m²/g, commercial product of Degussa Ultrasil® 3370 granulate.

Carbon black N 375: Specific surface (N2) 96 m²/g, specific surface CTAB 96 m²/g, DBP absorption 114 ml/100g, commercial product Degussa Corax® N 375.

Carbon black Vulkan 5H: Specific surface CTAB 81 m²/g, DBP absorption 150 ml/100 g, commercial product of Cabot Corporation.

Carbon black N 234: Specific surface (N2) 125 m²/g, specific surface CTAB 120 m²/g, DBP absorption 125 ml/100 g, commercial product of Degussa Corax® N 234.

Reinforcing agent: Mixture in the ratio 1:1 of carbon black N 330 and polysulphidic organosilane, commercial product of Degussa X 50-S.

Aging protection agent A: N-(1,3-dimethylbutyl)-N'-phenyl-p-phenylenediamine.

Aging protection agent B: Poly-1,3-dihydro-2,2,4-trimethyl-chinoline.

Ozone protection agent A: Mixture of diaryl-p-phenylenediamines.

Ozone protection agent B: Mixture of n-, iso- and cyclo-paraffins.

Vulcanisation accelerator A: TBBS N-tert.-butyl-2-benzolthiazol-sulphenamide.

Vulcanisation accelerator B: DPG N,N'-diphenylguanidine.

Vulcanisation accelerator C: CBS N-cyclohexyl-2-benzolthiazolsulphenamide.

Moreover, two rubber mixtures of the second embodiment (examples 8 to 9) and a comparison rubber mixture (example 10) with the compositions set forth in the following table 3 were manufactured with the parts by weight of the components in the mixtures being quoted in each case.

TABLE 3

| Components | Examples | | |
|---|---|---|---|
| | 8 | 9 | 10 |
| Emulsion-SBR 1 | — | — | 31,73 |
| Emulsion-SBR 2 | 89,375 | 89,375 | 93,87 |
| Polyisoprene | 15 | 15 | |
| Polybutadiene | 20 | 20 | |
| Silica VN 3 | 37,5 | 37,5 | |
| Carbon black N 375 | | 40 | |
| Carbon black Vulkan 5H | 40 | | |
| Carbon black N 234 | | | 79 |
| Reinforcing agent | 6 | 6 | |
| Zinc oxide | 3 | 3 | 3 |
| Stearic acid | 2 | 2 | 2 |
| Aging protection agent A | 2,5 | 2,5 | 2,5 |
| Aging protection agent B | 1 | 1 | 1 |
| Ozone protection agent A | 1 | 1 | 1 |
| Ozone protection agent B | 2 | 2 | 2 |
| Aromatic coil | 13,75 | 13,75 | 12,7 |
| (Total oil content) | 38,125 | 38,125 | 38,3 |
| Vulcanisation accelerator A | 1,6 | 1,6 | |
| Vulcanisation accelerator B | 0,75 | 0,75 | |
| Vulcanisation accelerator C | | | 1,4 |
| Sulpur | 1,4 | 1,4 | 1,9 |

TABLE 4

| | Examples | | |
|---|---|---|---|
| | 8 | 9 | 10 |
| Reference values to the measured tan δ at 70° C. | 130 | 132 | 100 |
| Rolling resistance | 107 | 101 | 100 |
| Driving behaviour on wet roads | 100 | 100 | 100 |

The components set forth in table 3 are explained as follows:

Emulsion-SBR 2: Oil-extended styrene-butadiene copolymer manufactured by emulsion polymerisation with 37.5 parts by weight of highly aromatic oil per 100 parts by weight of styrene-butadiene copolymer, with 31.5 weight percent styrene in the pure (oil-unextended) styrene-butadiene copolymer with 7% 1,4-cis bonds in the butadiene component, 47% 1,4-trans bonds in the butadiene component and 13% 1,2-vinyl bonds in the butadiene component and also with a Tg of −40° C.

All remaining components are identical with those of Table 1 and are explained there.

The rubber mixtures of the examples 1 to 10 were respectively manufactured in the following way. In the first stage the elastomers were put into a kneader and kneaded with a kneader temperature of 50° C. and a speed of kneader rotation of 50 per minute. Then zinc oxide, stearic acid, aging protection agent and ozone protection agent were added and kneaded in. Thereafter, in each case, half of the silica, of the reinforcing agent and of the aromatic oil in the case of the examples 1, 2, 5 and 6, half of the silica, of the carbon black, of the reinforcing agent and of the aromatic oil in the case of the examples 3, 4, 8 and 9, and in each case half of the carbon black and of the aromatic oil in the case of the comparison examples 7 and 10 were kneaded in. Finally, the respective second halves of the above named components were added and kneaded in. In the entire mixing process a maximal temperature of 160° C. was kept to.

After cooling down of the mixtures the were kneaded again in a second stage, with a temperature of 160° C. again not being exceeded. The second stage was only carried out with the rubber mixtures of the examples 1 to 6, 8 and 9, but not however with the carbon black mixtures of the examples 7 and 10. Finally, the vulcanisation system consisting of sulphur and vulcanisation accelerators were mixed in on a roll in a third stage (in the examples 7 and 10 of the second stage). During this a temperature below the crosslinking temperature was also kept to.

The loss factor tan δ was determined from the sample bodies manufactured from the rubber mixtures. The value 100 was associated with the value measured for the rubber mixture of example 7 and the values measured for the other rubber mixtures 1 to 6 were respectively set forth in table 2 as relative values when compared with the reference value 100. Values over 100 signify improvement of the characteristics. A corresponding procedure was used for the values which were measured for the rolling resistance and the driving behaviour on wet roads with the tires manufactured from the rubber mixtures. All results are set forth in Table 2. In just the same way the value 100 was associated with each of the values measured for the rubber mixture of example 10 and the values measured for the other rubber mixtures 8 and 9 are set forth as relative values when compared to this reference value 100 in table 4.

We claim:

1. Rubber mixture vulcanisable with sulphur comprising a copolymer of conjugated diene and vinyl aromatic compound, silica as a filler material, customarily used additives and also a vulcanisation system, characterized in that the rubber mixture contains 5 to 28 parts by weight of copolymer of conjugated diene and vinyl aromatic compound manufactured by solution polymerisation, 20 to 85 parts by weight of copolymer of conjugated diene and vinyl aromatic compound manufactured by emulsion polymerisation, 0 to 40 parts by weight of polyisoprene having a 3,4-bond content of at least 50% by weight, 10 to 40 parts by weight of polybutadiene, 25 to 90 parts by weight of silica and also 5 to 90 parts by weight of carbon black, with all parts by weight being respectively related to 100 parts by weight of total elastomers.

2. Rubber mixture in accordance with claim 1, characterised in that it contains 10 to 28 parts by weight of copolymer of conjugated diene and vinyl aromatic compound manufactured by solution polymerisation, 20 to 70 parts by weight of copolymer of conjugated diene and vinyl aromatic compound manufactured by emulsion polymerisation, 5 to 30 parts by weight of polyisoprene and 15 to 40 parts by weight of polybutadiene.

3. Rubber mixture in accordance with claim 1, characterised in that it contains 30 to 90 parts by weight of silica.

4. Rubber mixture in accordance with claim 1, characterised in that the copolymer manufactured by solution polymerisation has a glass transition temperature of −15° to −30° C.

5. Rubber mixture vulcanisable with sulfur containing a copolymer of conjugated diene and vinyl aromatic compound, silica as filler, customarily used additives and also a vulcanisation system, characterised in that the rubber mixture contains 20 to 75 parts by weight of copolymer of conjugated diene and vinyl aromatic compound manufactured by emulsion polymerisation, 10 to 30 parts by weight of polyisoprene having a 3,4-bond content of at least 50% by weight, 15 to 50 parts by weight of polybutadiene, 25 to 90 parts by weight of silica and also 20 to 90 parts by weight of carbon black, with all parts by weight being respectively related to 100 parts by weight of total elastomers.

6. Rubber mixture in accordance with claim 5, characterised in that it contains 30 to 80 parts by weight of silica.

7. Rubber mixture in accordance with claim 6, characterised in that it contains 30 to 45 parts by weight of silica.

8. Rubber mixture in accordance with claim 1, characterised in that it contains 30 to 70 parts by weight of carbon black.

9. Rubber mixture in accordance with claim 5, characterised in that it contains 30 to 70 parts by weight of carbon black.

10. Rubber mixture in accordance with claim 1, characterised in that the copolymer manufactured by emulsion polymerisation has a content of vinyl aromatic compound of 10 to 50% by weight.

11. Rubber mixture in accordance with claim 5, characterised in that the copolymer manufactured by emulsion polymerisation has a content of vinyl aromatic compound of 10 to 50% by weight.

12. Rubber mixture in accordance with claim 1, characterised in that the copolymer manufactured by emulsion polymerisation has a glass transition temperature in the range from −25° C. to −55° C.

13. Rubber mixture in accordance with claim 5, characterised in that the copolymer manufactured by emulsion polymerisation has a glass transition temperature in the range from −25° C. to −55° C.

14. Rubber mixture in accordance with claim 1, characterised in that the polybutadiene has a 1,4-cis-bond content of at least 90% by weight.

15. Rubber mixture in accordance with claim 5, characterised in that the polybutadiene has a 1,4-cis-bond content of at least 90% by weight.

16. Rubber mixture in accordance with claim 1, characterised in that the copolymers are manufactured from butadiene and styrene.

17. Rubber mixture in accordance with claim 5, characterised in that the copolymers are manufactured from butadiene and styrene.

18. Tyre tread, characterised in that it contains a rubber mixture vulcanisable with rubber in accordance with claim 1.

19. Tyre, characterised in that it has a tread in accordance with claim 18, vulcanised with sulphur.

20. Tyre tread, characterized in that it contains a rubber mixture vulcanisable with rubber in accordance with claim 5.

21. Tyre, characterised in that it has a tread in accordance with claim 20, vulcanised with sulphur.

* * * * *